United States Patent [19]

Lee

[11] Patent Number: 5,269,018
[45] Date of Patent: Dec. 7, 1993

[54] METHOD FOR AUTO-FORMATTING A HARD DISK DRIVE FOR A COMPUTER SYSTEM

[75] Inventor: Kyu E. Lee, Kyungki, Rep. of Korea

[73] Assignee: Hyundai Electronics Industries Co., Ltd.

[21] Appl. No.: 799,383

[22] Filed: Nov. 27, 1991

[30] Foreign Application Priority Data

Nov. 29, 1990 [KR] Rep. of Korea .................. 90-19437

[51] Int. Cl.$^5$ ................ G11B 20/12; G11B 20/18
[52] U.S. Cl. ....................... 395/575; 360/72.1; 395/700
[58] Field of Search ............ 395/575, 700; 360/53, 360/72.1; 369/53, 57

[56] References Cited

U.S. PATENT DOCUMENTS

3,956,736  5/1976  Jacques et al. ............... 340/172.5
4,736,341  4/1988  Redmond et al. ............. 364/900

Primary Examiner—Stephen M. Baker
Assistant Examiner—Norman M. Wright
Attorney, Agent, or Firm—Merchant Gould Smith Edell Welter & Schmidt

[57] ABSTRACT

A method for auto-formating a HDD operatively attached to a computer system is disclosed and includes the steps of: (A) effecting the CPU to read data of the FDD to determine whether a FLAG 1 file exists in the read data; (B) re-effecting the CPU to read data of FDD and delete temporary files if temporary files exist in the read data; (C) effecting the CPU to determine whether low level formatting has been completed, to access the FDD through the FDC, and to transmit data stored in the memory to the FDD, and form a PREFORM.YES file, if HDD has been low level formatted; (D) storing bad track information acceptable for the capacity of the HDD by effecting the CPU to calculate the capacity of the HDD, and determining a landing zone of the HDD; (E) deleting temporary files resulting when an error at step (D) exists, and renaming the FLAG 1 file to FLAG 2; (F) determining the landing zone and storing a time-converted interrupt at the predetermined address of the memory by effecting the CPU to control the interrupt of the timer for converting the interrupt of the timer into the time; (G) renaming the FLAG 2 file to FLAG 3, and determining whether the PREFORM.YES file exists; (H) formatting the HDD with a low level formatting, and determining whether completed or not such that it restarts, if the formatting has been done without any error; (I) establishing an error file, if an error has occurred at step (H); (J) displaying the error message; and, (K) ending the formatting operation.

8 Claims, 5 Drawing Sheets

METHOD FOR AUTO-FORMATTING A HARD DISK DRIVE FOR A COMPUTER SYSTEM

BACKGROUND OF INVENTION

1. Field of the Invention

The invention relates to a method for auto-formatting a hard disk drive operatively attached to a personal computer.

2. Information Disclosure Statement

Generally, when an user wants to format a hard disk drive (hereinafter, HDD) in a computer system, three stages of formatting: low-level formatting, DOS partition formatting and DOS formatting, are performed in the order presented. In order to perform such formatting, programs which have developed for each of the three formatting stages are used. With the use of such programs, the user must make a number of keystrokes on the keyboard of the computer system to execute the programs. Further, a lot of time is required to complete the performance of such programs, making such programs very inefficient to use. In addition, a careless mistake in manipulation of the keyboard by operator may damage the HDD.

It is assumed that the HDD is operatively attached to the personal computer (hereinafter, PC). When the computer is turned on to perform the formatting of the HDD, the surface temperature of the main media of the HDD gradually rises over a period of time which results in thermal expansion of the HDD media. Therefore, the surface state changes due thermal expansion and effects the record density of the media, so that the operational characteristics of the HDD may undesirably change. Accordingly, the change of the surface temperature of the media undesirably damages the HDD.

Therefore, it is an object of the present invention to solve the problem mentioned above, and to provide a method for auto-formatting the HDD, which simplifies keyboard input, operation time thereof, and prevents damage to the HDD, due to a change of the operation characteristic of the HDD as described above.

According to this invention, prevention of a careless mistake in performing the formatting programs, increased efficiency in formatting due to a decrease in the time required, and a stable formatting operation to the HDD are accomplished, by using a programmed RAM without directly executing the key-inputting manipulation required for performing each of programs. Also, after completing the performing of the intended programs, the user can easily determine whether the results of the resulting performance are erroneous or not.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The method for auto-formatting the hard disk drive according to the present invention is defined by the claims with a specific embodiment shown in the attached drawings. For the purpose of summarizing the invention, the invention relates to a method for auto-formatting a HDD operatively attached to a computer system. The computer system includes a CPU, a FDD, a timer for producing interrupt signals with each signal having a predetermined time interval, a keyboard controller for converting a scan code from the keyboard into a system scan code which can read by the CPU, a FDC for accessing the FDD and transmitting data through a DMA controller, a HDC for accessing a HDD, an interrupt controller for inputting the interrupt signals from the timer, keyboard, FDC, HDC, to request the interrupt to the CPU and perform an interrupt acknowledge signal. The method comprises the steps of:

(A) effecting the CPU to read data of the FDD through the FDC, to determine whether a FLAG 1 file exists in the read data;

(B) re-effecting the CPU to read data of FDD, such that the FDC effects the FDD to delete temporary files if temporary files exist in the read data;

(C) effecting the CPU to determine whether low level formatting of the HDD has been completed, to access the FDD through the FDC, and to transmit data stored in the memory through the DMA controller to the FDD, and forming a PREFORM.YES file, if low level formatting of the HDD has been completed;

(D) storing bad track information acceptable for the capacity of the HDD by effecting the CPU to calculate the capacity of the HDD, and determining a landing zone of the HDD by reading an interrupt vector table of the HDD from a predetermined address of the memory;

(E) deleting temporary files including BAD_LOWF, BAD_FDSK and BAD_DOSF files which result when an error at step (D) exists, and renaming the FLAG 1 file to FLAG 2;

(F) determining the landing zone by re-reading the interrupt table of the HDD from the predetermined address of the memory, and storing a time-converted interrupt at the predetermined address of the memory by effecting the CPU to control the interrupt of the timer for converting the interrupt of the timer into the time;

(G) renaming the FLAG 2 file to FLAG 3 by operating the FDD through the FDC, and determining whether the PREFORM.YES file exists;

(H) formatting the HDD with a low level formatting, and determining whether the low level formatting has been completed or not such that it restarts, if the formatting has been done without any error;

(I) establishing an error file, if the error has occurred at step (H);

(J) displaying the error message; and, (K) ending the formatting operation.

Step (A) may further include the steps of: (L) determining whether the temporary files including the BAD_LOWF, BAD_FDSK and BAD_DOSF files showing the occurrence of an error exist or not if the FLAG 1 file does not exist at step (A); and, (M) determining whether the FLAG 2 file exists, or not, such that it proceeds to step (F) if the FLAG 2 file exists.

Step (M) may further include the steps of: (N) determining whether a FLAG 3 file exists, or not, if the FLAG 2 file does not exist; (O) renaming the FLAG 3 file to FLAG 4, if the FLAG 3 file exists; (P) effecting the CPU to establish an operational environment for which DOS resides at the media of the HDD, through the HDC; (Q) determining if an error occurred on the established environment operation for DOS, such that it restarts if there is no error, or it stores the error through the FDC to the FDD, if any; (R) displaying the error message; and, (S) ending the formatting operation.

Step (N) may further include the steps of: (T) determining whether a FLAG 4 file exists, or not, if the FLAG 3 file does not exist, such that the CPU performs a logical formatting to a logical drive C of the HDD through the HDC to establish the operational environment for DOS; (U) determining whether the capacity of the HDD is above 32MB, such that the CPU re-performs the formatting to a logical drive D of the HDD through the HDC; (V) establishing an error file and storing it, if the error occurred in formatting to the logical drive D of the HDD; (W) displaying the error message; and, (X) proceeding to step (K).

Step (U) may further include the steps of: (Y) renaming the FLAG 4 file to FLAG 1 if the formatting to the logical drive D of the HDD has been completed without any error; and, (Z) effecting the CPU to determine an interrupt vector table from a predetermined address of the memory, such that it determines a landing zone of the HDD and performs "DIR BAD *" command, and ends the formatting operation.

Step (L) may further include the steps of: (L1) determining whether the BAD_LOWF file exists or not, and proceeding to step (J), if not; (L2) determining whether the BAD_FDSK file exists or not, if the BAD_LOWF file do not exist at step (L1), and proceeding to step (R), if the BAD_FDSK file exists; (L3) determining whether the BAD_DOSF file exists or not, if the BAD_FDSK file do not exist at step (L2), and proceeding to step (W), if the BAD_DOSF file exists.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION OF THE INVENTION

Figure 1:
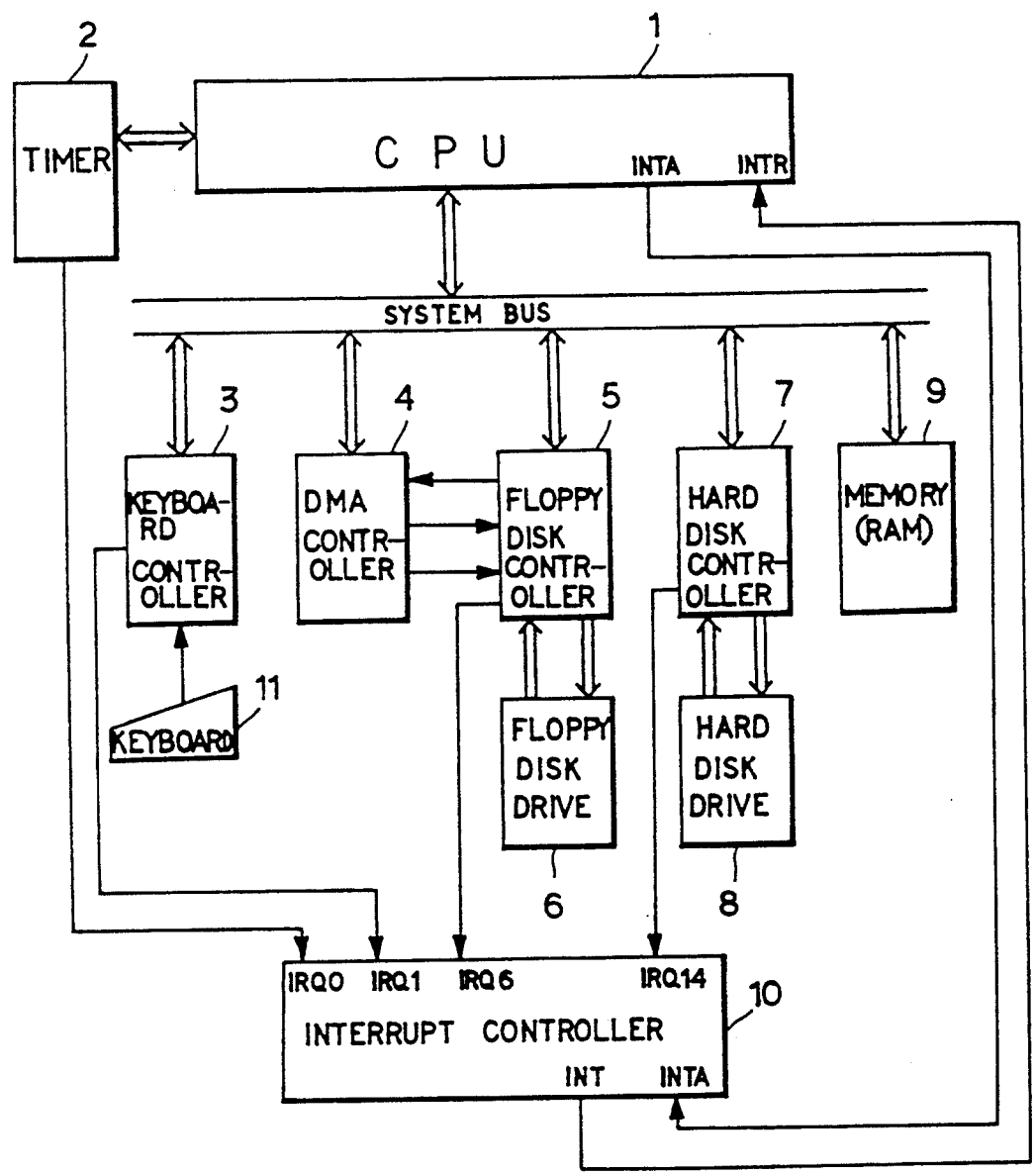
FIG. 1 illustrates a block diagram of hardware used in the auto-formatting of the HDD according to the present invention.
Figure 2A:
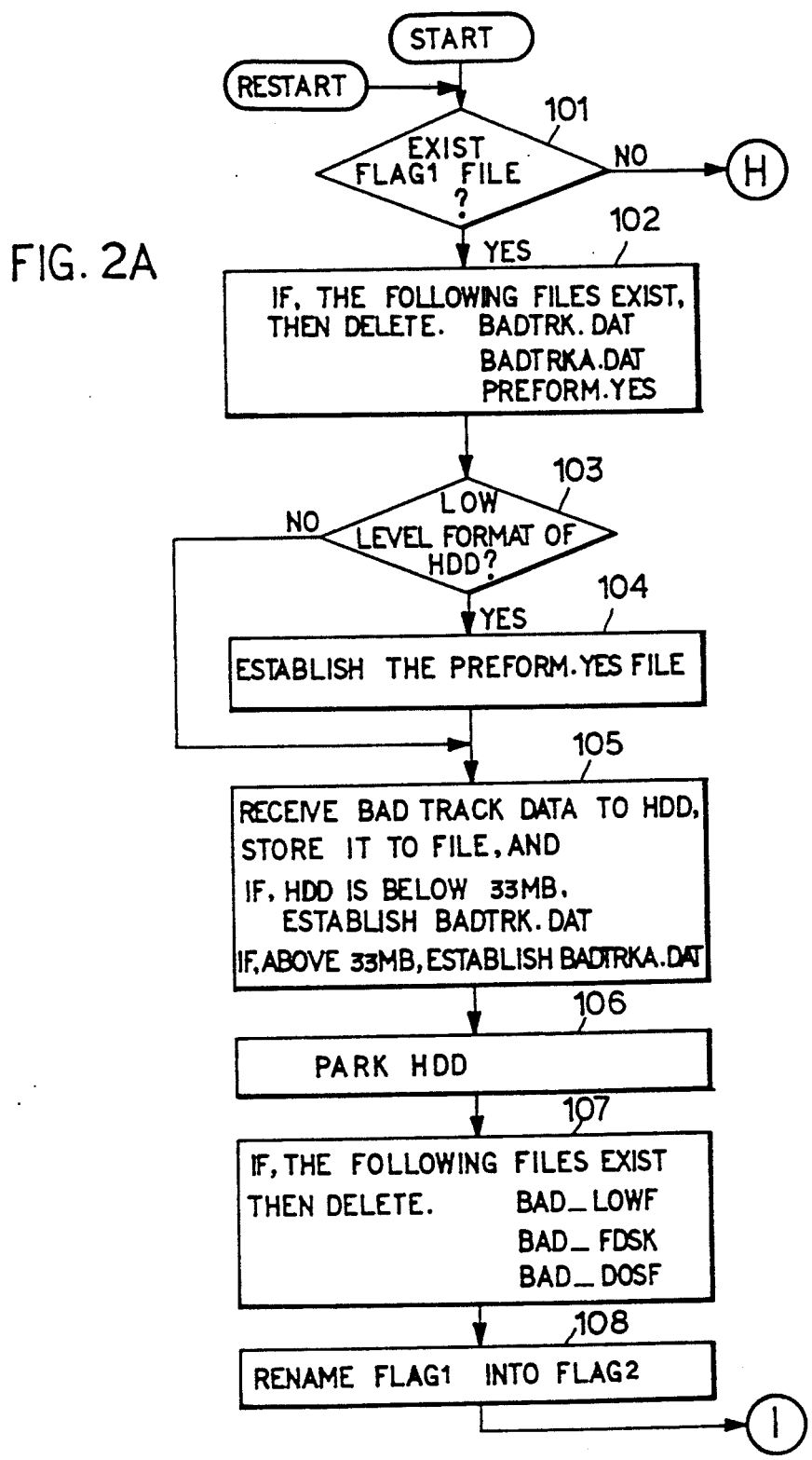
FIGS. 2A-2D illustrate a flow chart for explaining the operational procedures of FIG. 1 according to the present invention.
Figure 2B:
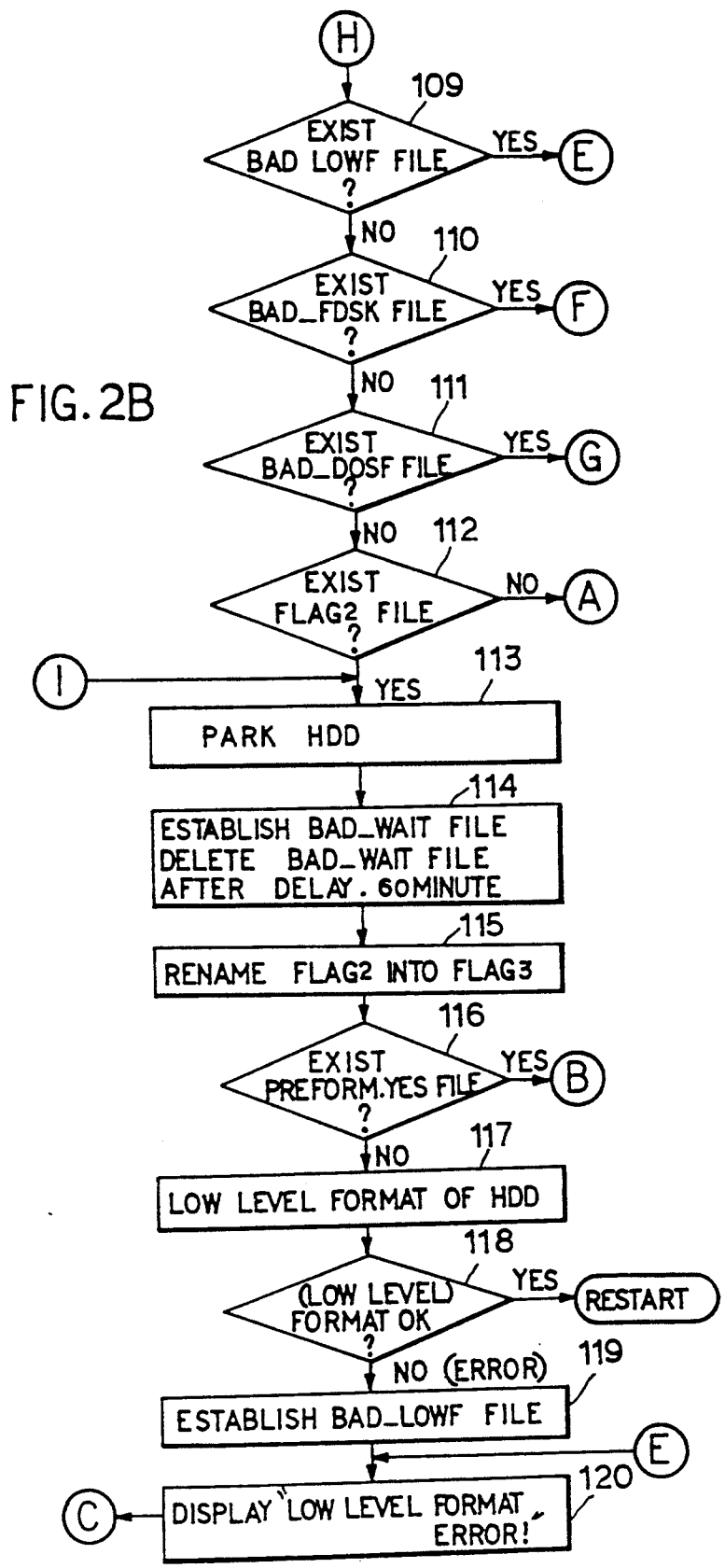
Figure 2C:
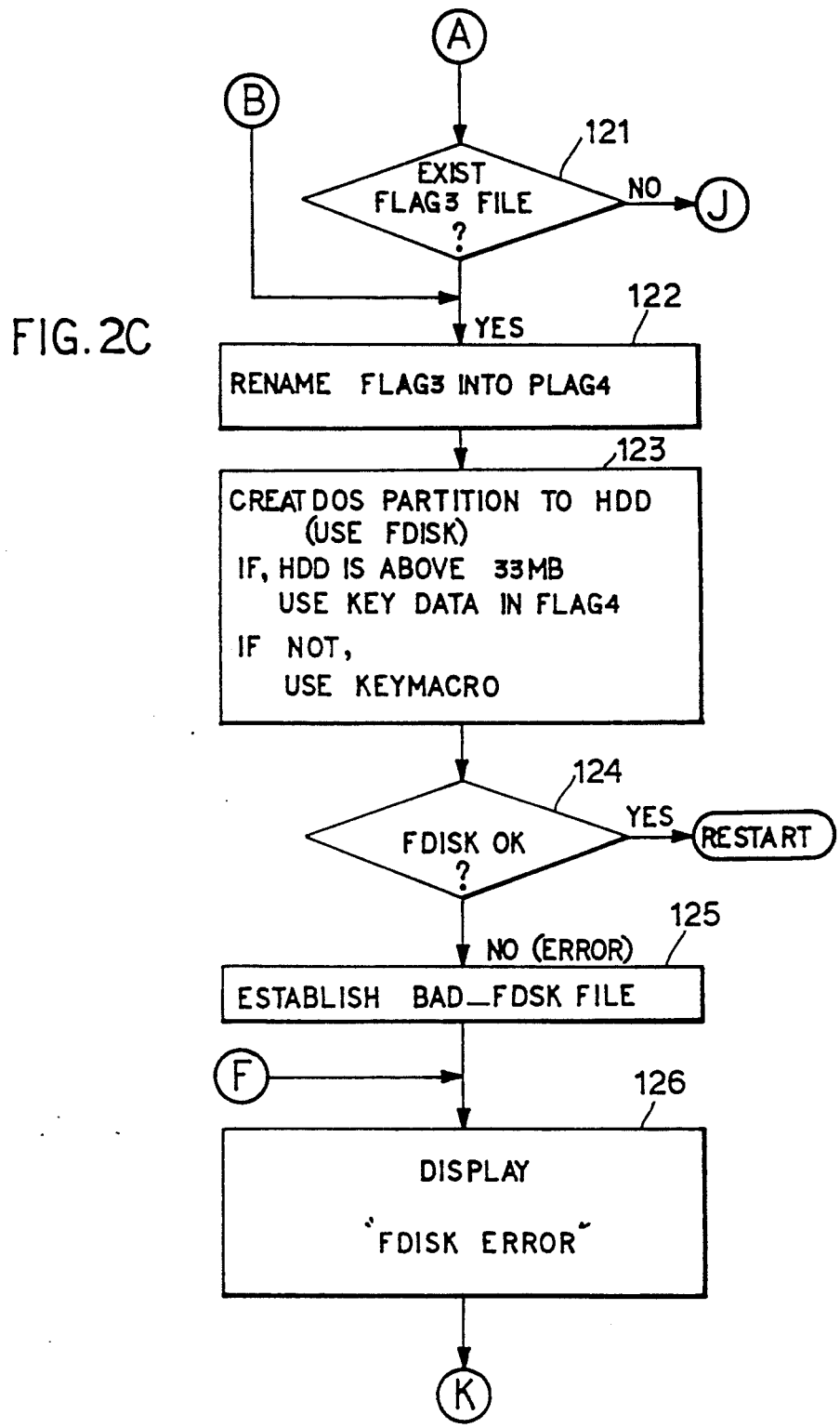
Figure 2D:
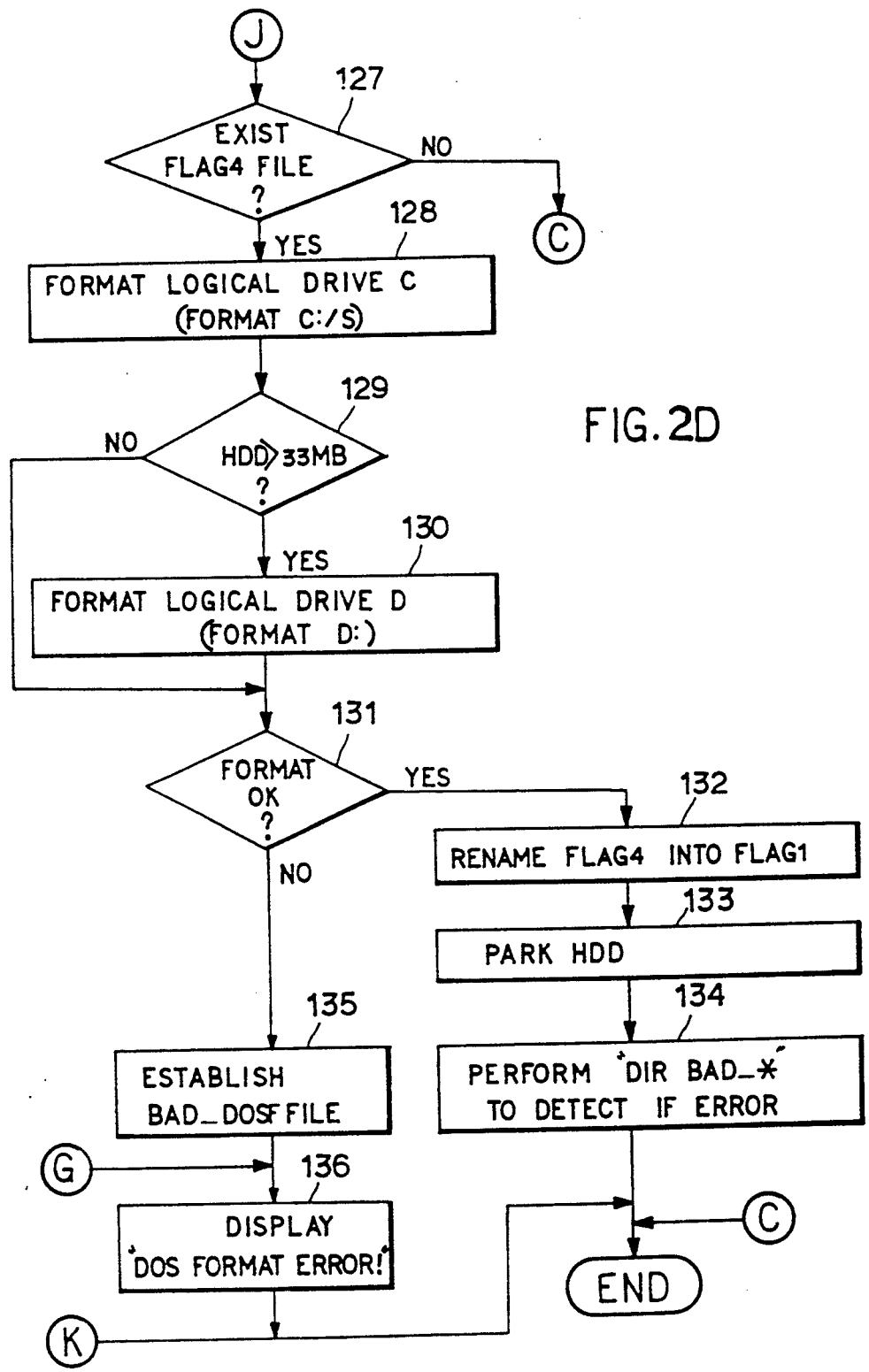

FIG. 1 illustrates a block diagram of the hardware used in auto-formatting the hard disk drive according to the present invention with the control relationship of each block being illustrated.

Referring to FIG. 1, the timer 2 is operated by initializing the timer 2 through the central processing unit 1 (hereinafter, CPU). If the timer 2 requests an interrupt request, an IRQ 0 through an interrupt controller 10, the interrupt controller 10 controls the interrupt request IRQ 0 from the timer 2 in priority, and requests an interrupt request INTR to the CPU 1.

Then, the CPU 1 acknowledges an interrupt INTA so that an interrupt from the timer 2 is controlled, for example, the 18.2 times per second of timer interrupt is controlled. The CPU 1 can confirm the current time from the predetermined address (for example 40H:6CH - 40:6FH) on a memory (RAM) 9 by an interrupt controlling routine.

In explaining the function of the keyboard 11, if the user inputs a particular key on the keyboard a keyboard controller 3 requires an interrupt request IRQ 1 through the interrupt controller 10. Here, the interrupt request IRQ 1 from the keyboard 11 has a second priority. If the interrupt controller 10 requests the interrupt request IRQ 1 to the CPU 1, the CPU 1 acknowledges (INTA) the interrupt request so that the interface between CPU 10 and the keyboard controller 3 is formed. The keyboard controller 3 then converts a scan code inputted from the keyboard 11 into a system scan code which can be recognized by the CPU 1, controls the command from the CPU 1 and informs the state of the keyboard 11 to the CPU 1.

According to the present invention, the above mentioned key manipulation is automatically controlled by utilizing a program memorized in the memory 9 rather than by the user directly. Explaining the principle of a floppy disk drive 6, in order to access the floppy disk drive 6 by the CPU 1, if the CPU 1 command to a floppy disk controller 5, the floppy disk controller 5 performs the command so that the floppy disk drive 6 is accessed to transmit data through a DMA (Direct Memory Access) controller 4. At this time, if the command is a "write" command, the command is transmitted from the memory 9 to the floppy disk drive 6. However, for the DMA controller 4, the concept of "write" is the opposite of the concept to "read". The interrupt controlling method is equal to that of the keyboard 11 (in the request procedure and acknowledge procedure), the interrupt occurs during the performance of the command operating before data is transmitted.

According to the operating principles of a hard disk drive 8, the hard disk drive 8 is accessed by the CPU 1 by a command to the hard disk controller 7 and the hard disk controller 7 executes a command so that the hard disk drive 8 is accessed. An interrupt request IRQ 14 from the hard disk controller 7 is transmitted through the interrupt controller 10 to the CPU 1. The, CPU 1 then acknowledges the interrupt request INTA so that the interface between CPU 1 and the hard disk controller 7 is formed. The, CPU 1 may then access the hard disk drive 8 through the hard disk controller 7. If the command is a "read" command, data is transmitted from the hard disk drive 8 to the memory 9, and if the command is a "write" command, data is transmitted from the memory 9 to the hard disk drive 8.

FIGS. 2A through 2D illustrate a flow chart of the operational function in accordance with FIG. 1. The step of "START" or "RESTART" is the first operating step of the present invention, after booting the system. Here, the file constructions used in present invention are as follows:

a. IO.SYS  
b. MSDOS.SYS  
c. COMMAND.COM = The system files of MS-DOS 3.30, in which they support the environment of the DOS operating commands. Here the IO.SYS and MSDOS.SYS files are a hidden files, which can not be read by "DIR" command.

d. FORMAT.COM = The utility of MS-DOS 3.30 for operating the DOS formatting.

e. FDISK.COM = The utility of MS-DOS 3.30 for constructing the DOS partition.

f. HDDPARK.COM = The program for parking the head of the HDD into the landing zone.

g. KEYMACRD.COM = The RAM residing program for automatically processing the key input of which the program requires the key input from the(-FORMAT.COM, FDISK.COM, HDDFMT.COM)

h. HDDFMT.CO = Receives the bad-track information of HDD and stores it into the file. It then performs the low level formatting by referring the stored data, when formatting. If the HDD has been formatted with the low level formatting in manufacturing process already, it is indicated as PREFORM.YES file.

i. WAIT.CO = When performing this program, it delays the time for a period of the given parameter.

j. FLAG 1 = Describes the operating step according to the invention, in which in order to indicate each step, file name is converted to FLAG2, FLAG3, FLAG4 and is finally returned to FLAG1 again. The files include the key input data for constructing the partition above 32MB of the HDD (H means 16 decimal number) as follows: 0DH, 0DH, 6EH, 0DH, 0DH, 1BH, 0DH, 32H, 0DH, 0DH, 1BH, 0DH, 1BH, 32H, 0DH, 31H, 0DH, 1BH, 1BH, 0DH.

k. AUTOEXEC.BAT = The main file for controlling the general operation of the software of the invention.

In a process for performing the file used in present invention as mentioned above, the following temporary files can be established. However, items o, p, g can not be established, unless error is not found during the formatting process.

l. BADTRK.DAT = Includes the bad-track information of the HDD and is established below 32MB of the HDD.

m. BADTRAKA.DAT = Includes the bad-track information and is established above 32MB of the HDD.

n. PREFORM.YES = If the HDD has been formatted with the low level formatting in manufacturing process already, it is the file for indicating that is not necessary to format again.

o. BAD_LOWF = If the low level formatting is completed by utilizing FDDHMT.COM program in due course, the system is rebooting again. However, if an error is occurred during the low level formatting, this file is made and is indicated.

p. BAD_FDSK If = the DOS partition construction is processed regularly by utilizing the FDISK.COM program, the system is booting again. However, if an error occurred, this file is made and it is indicated.

q. BAD_DOSF If an error is occurred during the DOS formatting by utilizing the FORMAT.COM program, this file is made and it is indicated.

The operation sequence is described in FIGS. 2A through 2D with reference to the files used in the invention as described above.

If the CPU 1 is initialized with a starting signal and gives the read command to the FDC 5, the FDC 5 performs the read command to read the FDD 6 so that if the FLAG 1 file exists at step 101, step 101 proceeds to step 102. At step 102, if the temporary files exist by re-reading the FDD 6, the FDC 5 effects the FDD 6 to delete the temporary files so that the operational environment is initialized, and it proceeds to step 103.

At step 103, after identifying whether the HDD 8 has been formatted with the low level formatting, and if the formatting has been done, it proceeds to step 104, or if formatting has not been done, it proceeds to step 105. At step 104, the CPU 1 gives a predetermined command to the FDC 5. The FDC 5 then performs the command to access the FDD 6, and transmits data stored in the memory 9 through the DMA 4 to the FDD 6 to perform the write command, thereby establishing the PREFORM.YES file. It then proceeds to step 105.

At step 105, the CPU 1 calculates the capacity of the HDD 8, so that the bad track information acceptable for the capacity of the HDD 8 is stored therein through the FDD 6, and it proceeds to step 106.

At step 106, the CPU 1 reads the interrupt vector table of the HDD 8 from the predetermined address in memory 9 to determine the landing zone of the HDD 8. The CPU 1 resets the HDD 8 to initialize it through the HDC 7, and give the seek command to the HDC 7. Here, the cylinder to be sought is the landing zone. The HDC 7 with the command given moves the head of the HDD 8 to the landing zone. When the seek command is completed, the interrupt occurs as mentioned in connection with the operational principle of the HDD 8, and it proceeds to step 107.

At step 107, if the files BAD_LOWF, BAD_FDSK, BAD_DOSF exist, it deletes these files to initialize the operational environment. It then proceeds to step 108. At step 108, it renames the FLAG 1 file to the FLAG 2 file, and proceeds to step 113, at FIG. 2B.

In the meantime, if the FLAG 1 file did not exist at step 101, it proceeds to step 109. At step 109, by discriminating as to whether the BAD_LOWF file exists or not, it proceeds to step 120, if present, or it proceeds to step 110, if not present. At step 110, it discriminates if the BAD_FDSK file exists, and it proceeds to step 126, if present.

At step 110, it proceeds to step 111, if the BAD-FDSK file did not exist. At step 111, it discriminates as to whether the BAD_DOSF file exists or not, it proceeds to step 136, if present, or it proceeds to step 112, if not present.

At step 112, by discriminating as to whether the FLAG 2 file exists or not, it proceeds to step 121, if present, or it proceeds to step 113, if not present.

At step 113, the same operation as step 106 is performed and it proceeds to step 114. At step 114, the CPU 1 controls the interrupt of the timer 2 such that the CPU 1 re-reads data stored at the predetermined address (40H:6CH - 40H:6FH) of the memory 9 by converting the interrupt, which is generated by 18.2 times per second, of the timer into the present used time, to thereby acknowledge the present time. The CPU then memorizes by calculating the predetermined time which is after 60 minutes from the present time. The CPU 1 then continuously reads the present time and performs the program until the predetermined time is reached, and it proceeds to step 115.

At step 115, the CPU 1 operates the FDD 6 through the FDC 5 to rename the FLAG 2 file into the FLAG 3 file and to write the renamed file, and it then proceeds step 116.

At step 116, the CPU 1 operates the FDD 6 to detect whether the PREFORM.YES file exists, so that it proceeds to step 122, if the file does exist, or it proceeds to step 117 to perform the low level formatting, if the file does not exist, which will be described as follows:

1) The CPU 1 reads the address related to the resource of the HDD 8 from the predetermined address (0:118H) of the memory 9.

2) The CPU 1 operates the FDD 6 to thereby read the bad track information stored at step 102 and to transfer it to the memory 9.

3) The CPU 1 become in the ready state by initializing the state of the hardware of the HDD 8 through the HDC 7.

4) The CPU 1 establishes the format table to the interleave value inputted from the keyboard 11 to perform the physical format of the HDD 8 to the good sector.

5) The CPU 1 format the bad sector based on the bad track information which have already been read. The formatting is one of the write operation. The CPU 1 controls the HDD 8 through the HDC 7.

6) It proceeds to step 118 after the formatting is completed.

At step 118, the low level formatting result of the HDD 8 is detected, so that it restarts, if there is no error, or it proceeds to step 119, if an error is present. At step 119, the FDD 6 is operated to store the error content and it proceeds to step 120. At step 120, it displays the error message and ends the operation.

In the meantime, the operation restarted at the step 118 proceeds to step 121. At step 121, it detects whether the FLAG 3 file exists or not, and it then proceeds to step 122, if present, or proceeds to step 127, if not present.

At step 122, the CPU 1 operates the FDD 6 through the FDC 5 to rename the FLAG 3 file into the FLAG 4 file and to write the renamed file, and it proceeds to step 123.

At step 123, the CPU 1 controls the HDD 8 through the HDD 7, establishes the operational environment for which the DOS resides at the media of the HDD 8, and it proceeds then step 124.

At step 124, it is determined whether an error has occurred in the operation at the step 123 or not, and it restarts if no error, or it proceeds to step 125, if an error is present.

At step 125, the error content of step 124 is stored by operating the FDD 6 through the FDC 5, and it proceeds to step 126. At step 126, it displays the error message and ends its performance.

On the other hand, if the FLAG 3 file does not exist at step 121, it then proceeds to step 127. At step 127, it is determined whether the FLAG 4 file exists or not, and it ends if the file does not exist, or it proceeds to step 128, if the file exists.

At step 128, the CPU 1 performs the logical formatting to the HDD 8 through HDC 7 in order to establish the operational environment for DOS. That is, the formatting to the logical drive C is completed, and it proceeds then to step 129.

At step 129, the CPU 1 acknowledges whether the BADTRKA.DAT file exists, or not, through the FDD 6, and determines whether the capacity of the HDD 8 is above 32MB. If the capacity is above 32MB, it proceeds to step 130, or if not, it proceeds to step 131.

At step 130, the CPU 1 then controls the operation of the HDD 8 through the HDC 7 to perform the formatting to the logical drive D, and it proceeds to step 131.

At step 131, it is determined whether an error has occurred during the formatting at the step 130, and it proceeds to step 135, if the error exists.

At step 135, the CPU 1 stores the error content by controlling the FDD 6 through the FDC 5, and it then proceeds to step 136.

Furthermore, at the step 131, it proceeds to step 132, if the error does not exist, to rename the FLAG 4 file into the FLAG 1 file, and then proceeds to step 133.

At step 133, it performs an operation which is the same operation as the step 106, and proceeds then to step 134. At step 134, it performs the command, "DIR BAD *", and ends the operation. In the meantime, it displays the message "DOS FORMAT ERROR!", and ends the operation.

As mentioned above, according to the present invention, by auto-controlling the whole formatting operation to make the HDD usable, the work process is simplified and production output is improved because of the time saved by the present process. Further, since the formatting process of the HDD can be easily performed, the quality of the resulting products can be desirably improved.

Furthermore, since the auto-formatting process according to the invention can also be simultaneously performed with the aging test, which should be required in the manufacturing process of the HDD, the additional time for using the method of the present invention is not required.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A method for auto-formatting a HDD operatively attached to a computer system including a CPU, a FDD, a timer for producing interrupt signals with each signal having a predetermined time interval, a keyboard controller for converting a scan code from the keyboard into a system scan code which can read by the CPU, a FDC for accessing the FDD and transmitting data through a DMA controller, a HDC for accessing a HDD, an interrupt controller for inputting the interrupt signals from the timer, keyboard, FDC, HDC, to request the interrupt to the CPU and perform an interrupt acknowledge signal, the method comprises the steps of:

(A) effecting the CPU to read data of the FDD through the FDC, to determine whether a FLAG 1 file exists in the read data;

(B) re-effecting the CPU to read data of FDD, such that the FDC effects the FDD to delete temporary files if temporary files exist in the read data;

(C) effecting the CPU to determine whether low level formatting of the HDD has been completed, to access the FDD through the FDC, and to transmit data stored in the memory through the DMA controller to the FDD, and forming a PREFORM.YES file, if low level formatting of the HDD has been completed;

(D) storing bad track information acceptable for the capacity of the HDD by effecting the CPU to calculate the capacity of the HDD, and determining a landing zone of the HDD by reading an interrupt vector table of the HDD from a predetermined address of the memory;

(E) deleting temporary files including BAD_LOWF, BAD_FDSK and BAD_DOSF files which result when an error at step (D) exists, and renaming the FLAG 1 file to FLAG 2;

(F) determining the landing zone by re-reading the interrupt table of the HDD from the predetermined address of the memory, and storing a time-converted interrupt at the predetermined address of the memory by effecting the CPU to control the interrupt of the timer for converting the interrupt of the timer into the time;

(G) renaming the FLAG 2 file to FLAG 3 by operating the FDD through the FDC, and determining whether the PERFORM.YES file exists;

(H) formatting the HDD with a low level formatting, and determining whether the low level formatting has been completed or not such that it restarts, if the formatting has been done without any error;

(I) establishing an error file, if the error has occurred at step (H);

(J) displaying the error message; and, (K) ending the formatting operation.

2. The method of claim 1 wherein step (A) further includes the steps of:

(L) determining whether the temporary files including the BAD_LOWF, BAD_FDSK and BAD_DOSF files showing the occurrence of an error exist or not if the FLAG 1 file does not exist at step (A); and, (M) determining whether the FLAG 2 file exists, or not, such that it proceeds to step (F) if the FLAG 2 file exists.

3. The method of claim 2 wherein step (L) includes:

(L1) determining whether the BAD_LOWF file exists or not, and proceeding to step (J), if not;

(L2) determining whether the BAD_FDSK file exists or not, if the BAD_LOWF file do not exist at step (L1), and proceeding to step (R), if the BAD_FDSK file exists;

(L3) determining whether the BAD_DOSF file exists or not, if the BAD_FDSK file do not exist at step (L2), and proceeding to step (W), if the BAD_DOSF file exists.

4. The method of claim 2 wherein step (M) further includes the steps of:

(N) determining whether a FLAG 3 file exists, or not, if the FLAG 2 file does not exist;

(O) renaming the FLAG 3 file to FLAG 4, if the FLAG 3 file exists;

(P) effecting the CPU to establish an operational environment for which DOS resides at the media of the HDD, through the HDC;

(Q) determining if an error occurred on the established environment operation for DOS, such that it restarts if there is no error, or it stores the error through the FDC to the FDD, if any;

(R) displaying the error message; and, (S) ending the formatting operation.

5. The method of claim 4 wherein step (L) includes:

(L1) determining whether the BAD_FDSK file exists or not, and proceeding to step (J), if not;

(L2) determining whether BAD_FDSK file exists or not, if the BAD_LOWF file does not exist at step (L1), and proceeding to step (R), if the BAD_FDSK file exists;

(L3) determining whether the BAD_DOSF files exists or not, if the BAD_FDSK file does exist at step (L2), and proceeding to step (W), if the BAD_DOSF file exists.

6. The method of claim 4 wherein step (N) further includes the steps of:

(T) determining whether a FLAG 4 file exists, or not, if the FLAG 3 file does not exist, such that the CPU performs a logical formatting to a logical drive C of the HDD through the HDC to establish the operational environment for DOS;

(U) determining whether the capacity of the HDD is above 32MB, such that the CPU re-performs the formatting to a logical drive D of the HDD through the HDC;

(V) establishing an error file and storing it, if the error occurred in formatting to the logical drive D of the HDD;

(W) displaying the error message; and, (X) proceeding to step (K).

7. The method of claim 6 wherein step (U) further includes the steps of:

(Y) renaming the FLAG 4 file to FLAG 1 if the formatting to the logical drive D of the HDD has been completed without any error; and, (Z) effecting the CPU to determine an interrupt vector table from a predetermined address of the memory, such that it determines a landing zone of the HDD and performs "DIR BAD *" command, and ends the formatting operation.

8. The method of claim 6 wherein step (L) includes:

(L1) determining whether the BAD_FDSK file exists or not, and proceeding to step (J), if not;

(L2) determining whether the BAD_FDSK file exists or not, if the BAD_LOWF file does not exist at step (L1), and proceeding to step (R), if the BAD_FDSK file exists;

(L3) determining whether the BAD_DOSF files exists or not, if the BAD_FDSK file does exist at step (L2), and proceeding to step (W), if the BAD_DOSF file exists.

* * * * *

UNITED STATES PATENT AND TRADEMARK OFFICE
CERTIFICATE OF CORRECTION

PATENT NO.  :  5,269,018

DATED        :  December 7, 1993

INVENTOR(S) :  Kyu Eung Lee

It is certified that error appears in the above-identified patent and that said Letters Patent is hereby corrected as shown below:

In Column 5, line 26, "HDDFMT.CO" should read --HDDFMT.COM--.
In Column 5, line 32, "WAIT.CO" should read --WAIT.COM--.
In Column 7, line 50, "HDD 7" should read --HDC 7--.
In Column 10, line 13, Claim 5, "BAD_FDSK" should read --BAD_LOWF--.
In Column 10, line 20, Claim 5, "does" should read --does not--.
In Column 10, line 50, Claim 8, "BAD_FDSK" should read --BAD_LOWF--.
In Column 10, line 57, Claim 8, "does" should read --does not--.

Signed and Sealed this

Second Day of January, 1996

Attest:

BRUCE LEHMAN

Attesting Officer

Commissioner of Patents and Trademarks